(12) United States Patent
Noh et al.

(10) Patent No.: US 10,467,791 B2
(45) Date of Patent: Nov. 5, 2019

(54) MOTION EDIT METHOD AND APPARATUS FOR ARTICULATED OBJECT

(71) Applicant: KOREA ADVANCED INSTITUTE OF SCIENCE AND TECHNOLOGY, Daejeon (KR)

(72) Inventors: Junyong Noh, Daejeon (KR); Byungkuk Choi, Daejeon (KR); Roger Blanco i Ribera, Daejeon (KR); Seokpyo Hong, Daejeon (KR); Haegwang Eom, Daejeon (KR); Sunjin Jung, Daejeon (KR); J. P. Lewis, Daejeon (KR); Yeongho Seol, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 15/838,494

(22) Filed: Dec. 12, 2017

(65) Prior Publication Data

US 2018/0165860 A1 Jun. 14, 2018

(30) Foreign Application Priority Data

Dec. 13, 2016 (KR) ........................ 10-2016-0169525

(51) Int. Cl.
| | |
|---|---|
| *G06T 13/20* | (2011.01) |
| *G06F 3/0484* | (2013.01) |
| *G06T 13/40* | (2011.01) |
| *G06T 19/20* | (2011.01) |
| *G06F 3/0488* | (2013.01) |

(52) U.S. Cl.
CPC .......... *G06T 13/20* (2013.01); *G06F 3/04847* (2013.01); *G06T 13/40* (2013.01); *G06T 19/20* (2013.01); *G06F 3/04883* (2013.01); *G06T 2213/12* (2013.01); *G06T 2219/2004* (2013.01)

(58) Field of Classification Search
CPC . G06T 13/20; G06T 2213/12; G06F 3/04847; G06F 3/04883
USPC ....................................................... 345/474
See application file for complete search history.

(56) References Cited

U.S. PATENT DOCUMENTS

| | | | |
|---|---|---|---|
| 6,052,123 A | 4/2000 | Lection et al. | |
| 2012/0075349 A1* | 3/2012 | Lee ......................... | G06T 13/40 345/672 |
| 2016/0232698 A1* | 8/2016 | Kim ........................ | G06T 13/40 |
| 2016/0335790 A1* | 11/2016 | Fleishman ......... | G06K 9/00355 |
| 2016/0358365 A1* | 12/2016 | Sumner .................. | G06T 13/40 |
| 2018/0101976 A1* | 4/2018 | Lewis .................... | G09G 5/373 |

FOREIGN PATENT DOCUMENTS

| | | |
|---|---|---|
| JP | 2005-125460 | 5/2005 |
| KR | 10-1998-0086715 | 12/1998 |
| KR | 10-0782974 | 12/2007 |

* cited by examiner

*Primary Examiner* — Kimbinh T Nguyen (57) ABSTRACT

The present disclosure relates to a motion edit method for editing the motion of an articulated object using a computing device with a touch screen, including a) when any one of a joint path and a body line of an articulated object is selected by a user, setting a position constraint of higher level joint according to the user's sketching input and joint hierarchy, and b) generating motion of the articulated object for which the constraint is set.

4 Claims, 9 Drawing Sheets

MOTION EDIT METHOD AND APPARATUS FOR ARTICULATED OBJECT

CROSS-REFERENCE TO RELATED APPLICATIONS

This application claims priority of Korean Patent Application No. 10-2016-0169525, filed on Dec. 13, 2016, in the KIPO (Korean Intellectual Property Office), the disclosure of which is incorporated herein entirely by reference.

BACKGROUND OF THE INVENTION

Field of the Invention

The present disclosure relates to a motion edit method and apparatus, and more particularly, to a motion edit method and apparatus for editing an articulated object that estimates a pose of an articulated object in response to 2-dimensional abstract sketch input of the articulated object and applies and visualizes it to the articulated object.

Description of the Related Art

In general, motion capture, which inputs and measures the motion of objects including humans and organizes into computer data, measures changes in the position of each joint of an articulated object over time and organizes 3-dimensional (3D) data. Since the mid-1990s, with the emergence of commercial motion capture systems, motion capture started to replace keyframe animation that had been used in creating animation.

Earlier animation creating methods including keyframe animation require a large amount of time to make realistic and natural 3D motion. Most of 3D modeling software provides a function to create a desired motion by controlling (translating or rotating) joints.

A considerable amount of time is spent in making a simple motion, for example, running, of a character with a complex joint structure like a human being, realistic and natural. This process is very labor intensive and produces results dependent to animators and software used. As a result, with the increasing time and cost required to create character animation of games, negative effects happen in the terms of quantity and quality of content. In this context, Korean Patent No. 10-0782974 proposed a method for realizing 3D animation by conducting 3D motion analysis of an object using a motion analysis program and applying it to the object. To represent a realistic motion of a target object to be edited, Korean Patent No. 10-0782974 acquired motion information of an object identical or similar to the target object and reflected it on the target object. However, in case where there is no object after which the target object will model, this method is difficult to apply, and users have difficulties in arbitrarily editing the motion of the target object to be edited.

SUMMARY

The present disclosure is directed to providing a motion edit method for an articulated object that estimates and visualizes the motion of the articulated object to be represented in a 3-dimensional (3D) space using 2D sketch input transmitted to a computing device through an input device such as a touch screen or a mouse.

The object may be achieved by a motion edit method for editing the motion of an articulated object using a computing device with a touch screen, in which a user selects a body line or a joint path and selects one of three spaces, global space, local space and dynamic space, to properly constrain the articulated object in order to control the motion. To this end, there may be provided a motion edit method for editing the motion of an articulated object using a computing device with a touch screen, including a) when any one of a joint path and a body line of the articulated object is selected by a user through the touch screen, setting, by the computing device, a position constraint of higher level joint according to the user's sketching input and joint hierarchy; and b) generating, by the computing device, the motion of the articulated object for which the constraint is set.

The object is achieved, according to the present disclosure, by a touch screen configured to receive a user's sketching input of any one of a joint path and a body line of an articulated object displayed on the screen, and a processor configured to a) set a position constraint of higher level joint with regard to the joint path or body line selected by the user through the touch screen according to the user inputted sketching input and joint hierarchy, and b) compute the motion of the articulated object for which the constraint is set.

According to the present disclosure, there is provided a motion edit method and apparatus for an articulated object that estimates the pose of the articulated object in response to 2D based abstract sketch input and applies it to the articulated object to edit the pose.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A computing device as stated herein may refer to a computer, a tablet and a smartphone as well as a variety of devices equipped with a touch screen capable of motion editing with a hand or a touch pen using the touch screen. Accordingly, a computing device as stated herein may be a device equipped with an input device (a touch screen, a touch pen, a mouse or a keyboard), a processor, a memory, and a display device (a display device integrally formed with the touch screen).

A program for motion editing is mounted on the computing device, and the mounted program runs with the disclosure provided herein and algorithm (equation).

An articulated object as stated herein may refer to a living thing and machine having a plurality of joints as well as an animation character that can be represented as 3-dimensional (3D) image and an object (for example, a person, a thing, etc.) included in video such as a film. However, as the articulated object is converted and processed to editable image data in the computing device, it requires that the articulated object be an object captured by a camera or generated by an image processing program.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

Figure 1:
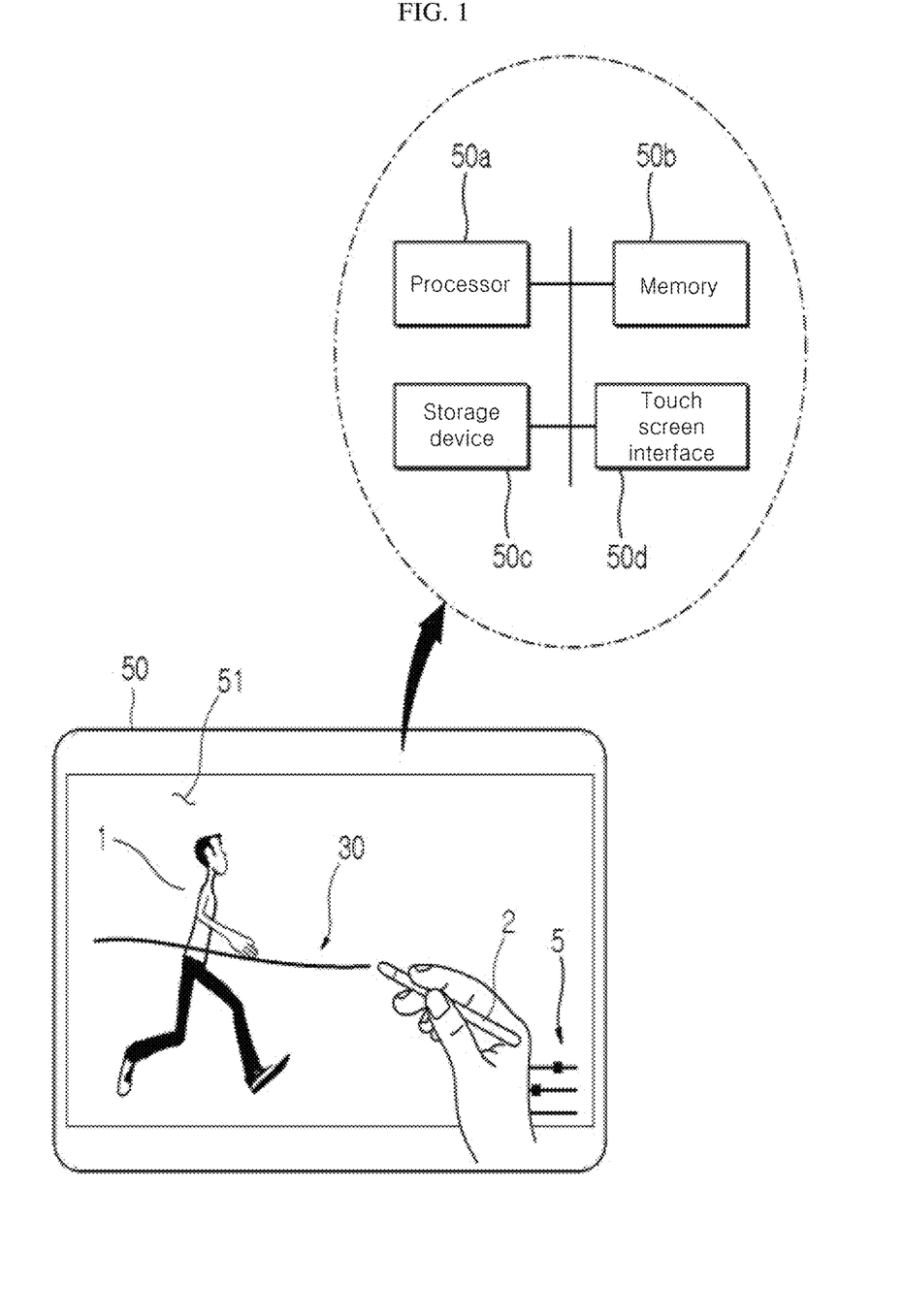
FIGS. 1 to 3 are conceptual diagrams of a motion edit method for an articulated object according to an embodiment of the present disclosure.
Figure 2:
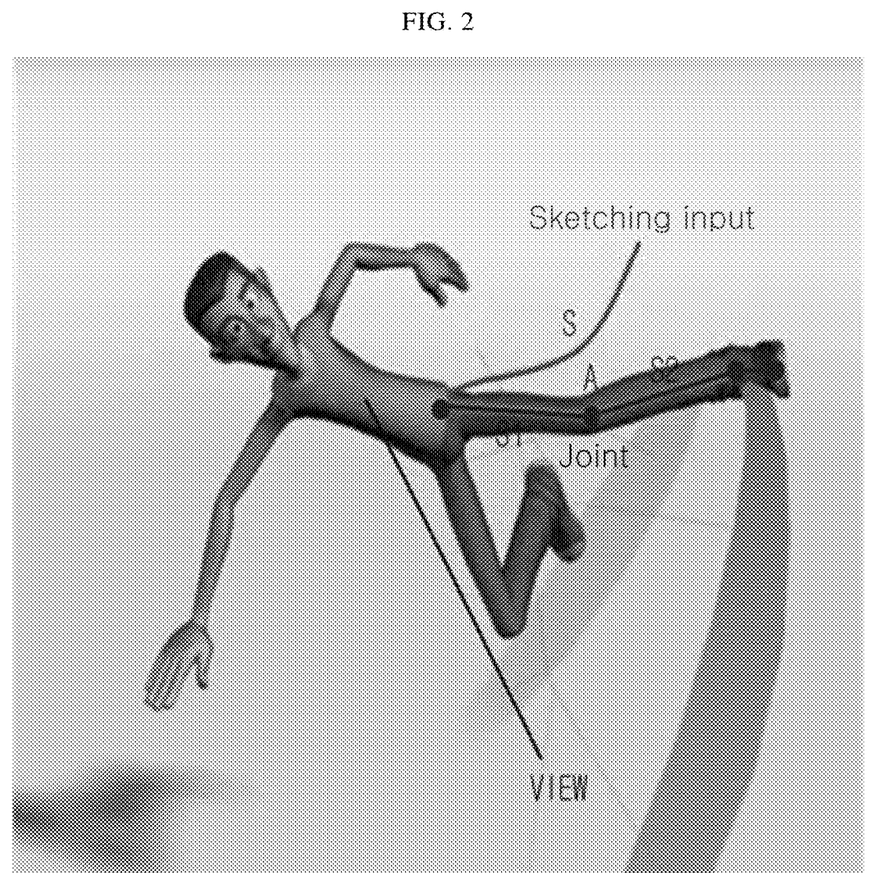
Figure 3:
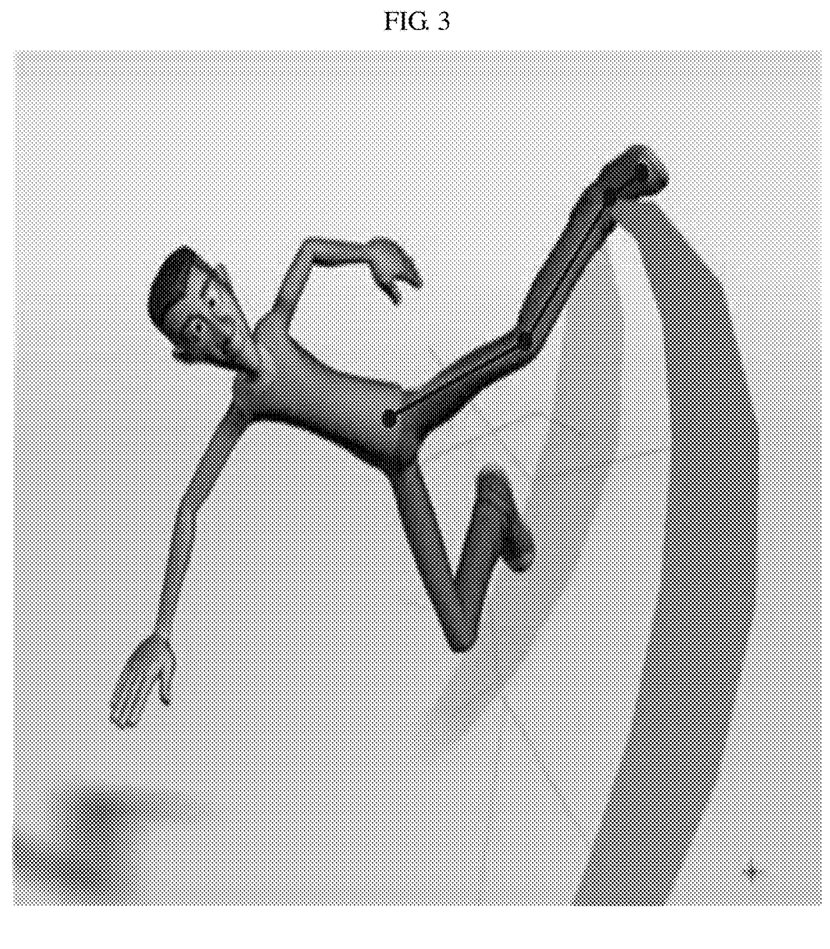

FIGS. 1 to 3 are conceptual diagrams of a motion edit method and apparatus for an articulated object according to an embodiment of the present disclosure.

The motion edit method for an articulated object (hereinafter referred to as "motion edit method") according to an embodiment may be performed through a computing device 50 with a touch screen 51 as shown in FIG. 1.

The computing device 50 includes a processor 50a, a memory 50b, a storage device 50c and a touch screen interface 50d and the touch screen 51, and besides, may further include an input/output interface device (not shown), a wired/wireless network interface (not shown) and a graphic card or a graphic chip.

The touch screen 51 may display an articulated object 1 and a menu for editing the articulated object 1 on the screen, and receive a user's sketching input of the articulated object 1 displayed on the screen and provide it to the touch screen interface 50d.

The touch screen interface 50d may interface the touch screen 51 and the processor 50a, obtain the user's sketching input through the touch screen 51 and provide it to the processor 50a, and provide graphic data computed by the processor 50a to the touch screen 51 to display the motion of the articulated object on the touch screen 51.

The storage device 50c may store an operating system and an application of the computing device 50 according to an embodiment, and may have an application using an algorithm (equation 1 to equation 23 as described below) for computing and editing the motion of the articulated object 1 in response to the user's sketching input inputted through the touch screen 51.

The processor 50a may be booted through the operating system provided in the storage device 50c, and run the application stored in the storage device 50c, and use the memory 50b for running the operating system and the application and processing temporary data generated by them.

Additionally, the processor 50a obtains the user's sketching input through the touch screen interface 50d, and determines a joint hierarchy by referring to the user's sketching input and the joint structure of the articulated object displayed on the touch screen 51. By referring to the joint hierarchy, the processor 50a may set a position constraint of higher level joint. Editing may be only performed on an object (joint path or body line) to which the user's sketching input is given by the position constraint setting as described below to prevent the generation of an inaccurate motion of an object (joint or body line) not selected by the user.

In response to a body line or joint path selected by the user through the touch screen 51, the motion of the articulated object may be controlled over the body line or joint path selected by the user, and may be visualized. Here, the body line refers to a line forming the skeleton in the character skeleton structure, and each body line that makes up the articulated object may be defined as a sub-chain of joints connected to higher level body line. This means that the body line of the articulated object according to an embodiment has a hierarchy with higher and lower level structure.

Figure 5:
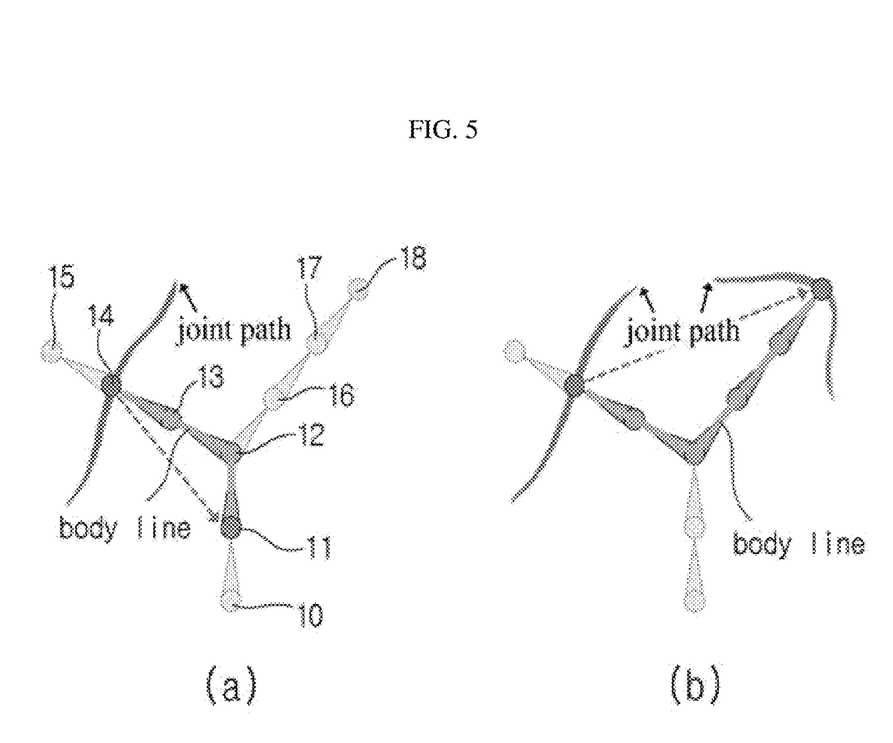
FIG. 5 is a reference diagram illustrating an example of a method for selecting a sketch target.

The joint path refers to representation of displacement of joint in the articulated object 1 with the character skeleton structure shown in FIG. 5 over time. Its detailed description will be provided through the article "sketch target selection" as below.

As shown in FIG. 2, the visualized articulated object 1 may be displayed on the touch screen 51 or a separate computer side display device (not shown) connected to the touch screen 51, and the user may select one of body lines (or joints) of the articulated object 1 and change the motion of the joint and body line in response to the sketching input 30.

In FIG. 2, when the user gives instructions to change the body line through the sketching input, the computing device 50 may change the body line or joint path in accordance to the sketching input as shown in FIG. 3. Although FIG. 2 shows the side plane of the articulated object 1, the articulated object 1 may be represented after changed to various angles as well as front, rear, top and bottom planes by the user's viewport selection. That is, the user may edit the motion of the joint selected by the user at various angles using an input device 2 such as a touch pen.

Figure 4:
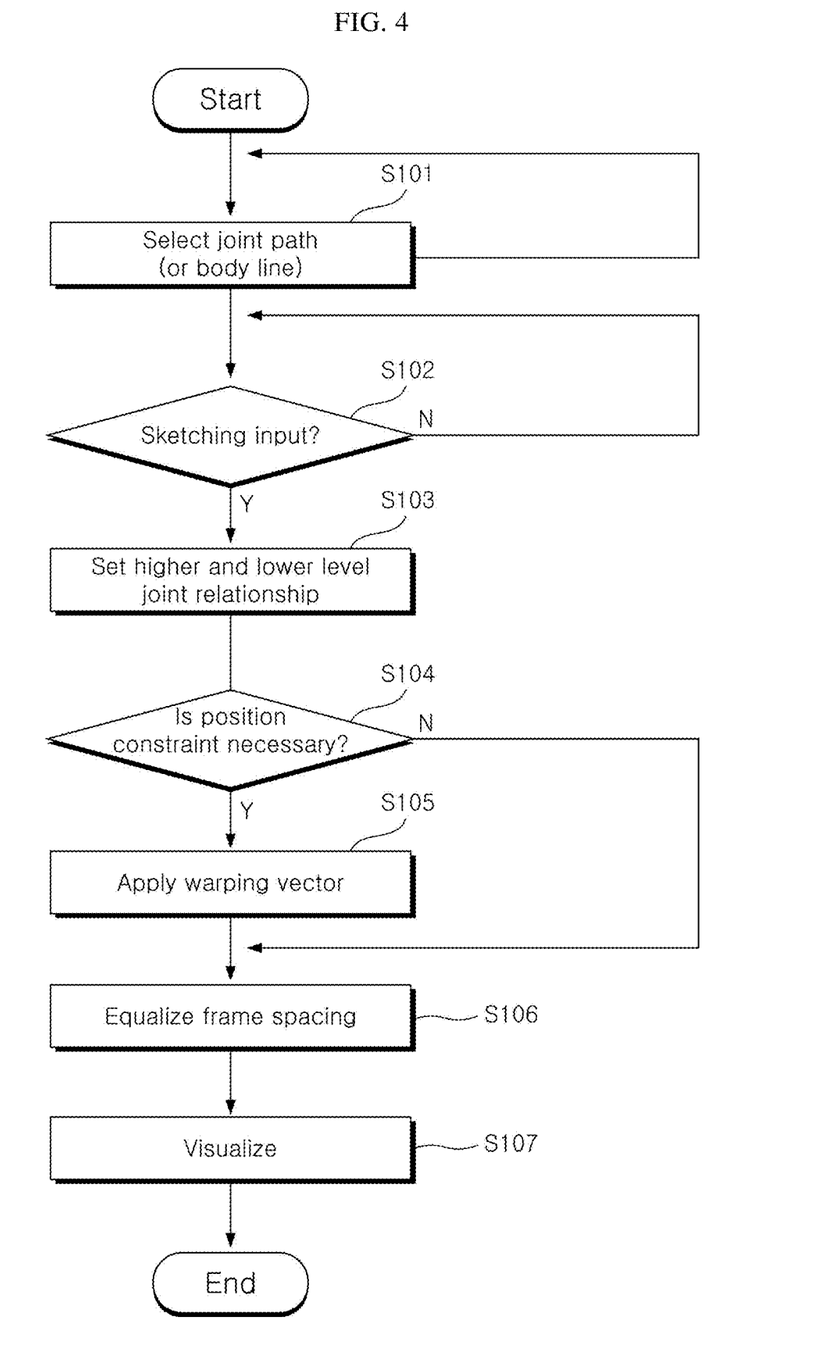
FIG. 4 is a flowchart of a motion edit method for an articulated object according to an embodiment of the present disclosure.

FIG. 4 is a flowchart of the motion edit method for an articulated object according to an embodiment of the present disclosure. For the description of FIG. 4, a reference is made to FIGS. 1 to 3 together.

First, the computing device 50 may display an articulated object on the touch screen 51 or display device (not shown), and a menu 5 with an edit tool such as space setting (local space, global space, and dynamic space) and brush mode on one side of the touch screen 51.

Subsequently, the computing device 50 receives a selection of joint (or joint path, hereinafter omitted) desired for the user to edit (S101).

Subsequently, the computing device 50 determines if a sketching input occurred from the touch screen 51 embedded in the computing device 50 (or the touch screen device 51 working with the computing device) (S102).

The sketching input is a perceived sketching line inputted onto the touch screen 51, and the sketching line may be represented as a 3D polyline made up of N vertices. Its detailed description will be provided through the article "sketch target" as below.

Subsequently, when the sketching input occurs, the computing device 50 may determine a relationship of higher and lower level joints of the target body line (or joint path) to be edited along the body line (or joint path) selected by the user through a selection menu 5 (S103), and determine if a position constraint of higher level joint is necessary based on the user's editing space (S104). When the body line (or joint path) to be edited in response to the sketching input is to be edited in dynamic space, the computing device 50 applies a warping vector to the articulated object 1 (S105). The warping vector is a vector that is effectively applied when editing the articulated object 1 in dynamic space, and its detailed description will be provided through the articles "sketch space" and "dynamic space" and relevant equations as below.

Meanwhile, according to the higher and lower level relationship of joint and body line, the motion range of lower level joint should be determined within the motion range of higher level joint, and the warping vector described in the step S105 may be applied. For example, in FIG. 2, when the user gives a sketching input from a waist area of the articulated object 1 toward a foot area, the motion edit method according to an embodiment perceives a mapping target of a joint A and a higher level body line S1 and a lower level body line S2 by analyzing the sketching input, maps a point at which a stroke S occurred in the sketching input to the joint, and re-connects the body line S1 corresponding to the thigh and the body line S2 corresponding to the leg with respect of the mapped joint position to transform the motion of the articulated object as shown in FIG. 3. When the sketching input shown in FIG. 3 is inputted to the computing device, the motion edit method needs the process of analyzing the position of the joint and the position of the body line and mapping to the articulated object 1. When the computing device 50 perceives the sketching input applied to the joint and the body line selected by the user, it is necessary to change the motion of the articulated object 1, and in this instance, the body line needs to be changed according to the moveable displacement of the body line based on the joint, and there is a need that the motion change of the lower level joint is not constrained by the higher level joint.

To this end, when the computing device 50 changes the motion of the lower level joint through the sketching input, it is necessary to constrain the higher level joint motion to prevent the higher level joint from affecting the motion change of the lower level joint. For example, the case is when the sketching input is only intended to change the motion of the lower level joint.

Subsequently, when a change in the motion of the joint path or body line occurs by the sketching input, the computing device 50 may equalize a time interval between a keyframe of a point in time at which the sketching input occurred and other frames before and after the keyframe (S106). Here, the number of image frames of the articulated object 1 increases in proportion to an increase in the distance from a camera that captures an image of the articulated object 1, or on the contrary, as the distance between the camera and the articulated object 1 is shorter, the number of image frames reduces.

Finally, the computing device 50 may display the articulated object 1 represented in 3D on the display device (or touch screen) using the equalized frame (S107).

Hereinafter, the motion edit method according to an embodiment will be described in detail with reference to equations and drawings.

Sketch Target

In general, animation is processed in a coarse-to-fine way. From initial rough motion, the animation is edited and processed to incrementally finer one.

A sketch target may be defined as a line in a scene ready to be sketched by a user. First, a sketch line is represented as a 3D polyline=S={$s_0, \ldots, s_{N-1}$} which is composed of N vertices. In the present disclosure, two primary sketch targets are defined; one is a body line and the other is a joint path, and may be extracted from a predefined motion of a character.

The body line is defined as a sub-chain of joints in the character skeleton structure. That is, this is a 1D joint chain that contains a set of joint positions at the time t, and may be represented by the following Equation 1.

$$S^{bl} = \{s_j^{bl}(t) \in \mathbb{R}^3 \mid \forall\ j \in J^{chain}\} \quad \text{[Equation 1]}$$

Here, $S^{bl}$ denotes a set of body lines, $s_j^{bl}(t)$ denotes a body line corresponding to $j^{th}$ joint changing over time t, and $J^{chain}$ denotes a set of joints.

A plurality of body lines may be defined at an arbitrary part of the body in a manual manner.

The definition of the body line according to the present disclosure is detailed, but an option is given to the user, so that freedom is given to the user in sketching a specific body part.

The joint path is a set of ordered positions, and is represented by the following Equation 2.

$$S^{jp} = \{s_j^{jp}(t) \in \mathbb{R}^3 \mid 0 \leq t < N_t\} \quad \text{[Equation 2]}$$

Here, $S^{jp}$ denotes a set of joint paths, and $s_j^{jp}(t)$ denotes $j^{th}$ joint path changing over time t.

This is uniformly sampled from the trajectory of the joint j across the time t, and $N_t$ denotes the total number of frames to be edited.

The joint path according to the present disclosure gives the user the ability to add expressive variations within a specific time interval. This range is modified as the user changes the camera view or current time.

The polyline is rendered with a varying thickness matching to the magnitude of the velocity of the joint. This visual feedback may be used for easy-in or easy-out of motion and editing of certain timing aspects (see the following description)

The sketch target in the present disclosure may be represented by the following Equation 3.

$$\mathbb{S} = \{S_i | 0 \leq i < N_s\} \quad \text{[Equation 3]}$$

Here, $N_s$ is the total number of selected sketch targets, and $S_i$ may be $S^{bl}$ or $S^{jp}$. $s_j^i(t)$ denotes a general target position, and is specified in the $i^{th}$ sketch target on the joint j at the time t. The exact position of the sketch target depends on the current choice of sketch space, and its detailed description is provided below.

Sketch Target Selection

Selecting the proper sketch targets is a very important step, and greatly vary depending on a given character and its motion. The present disclosure allows for target selection that is easy to use and very intuitive in accordance with three criteria, flexibility, usability and consistency.

To satisfy the three criteria, the present disclosure first allows the user to select two joints with a dragging motion. A single body line target may be defined using a shortest path according to the skeleton hierarchy between the two joints as.

Joint path targets are selected by considering two extreme joints on the hierarchy of the selected body line. Particularly, the present disclosure produces a joint path only when the extreme joint is a leaf joint. This is provided to allow the user to select a maximum of two joint path targets depending on the selected body line.

FIG. 5 is a reference diagram illustrating an example of a method for selecting a sketch target.

Referring to FIG. 5, a body line and a joint path (left), and a body line and two joint paths (right) are shown. In FIG. 5, red and blue joints are two leaf joints on a joint chain selected for generating two joint paths.

Finally, the present disclosure places a position constraint on the top-most hierarchy of the selected body line. With this, only a sketch target for which a sketching operation is selected will be affected. By selecting a single joint and an immediate parent, an FK type constraint may be attained, whereas dragging the line of the hierarchy further down allows IK type behavior.

Sketch Space

The articulated object 1 according to an embodiment may be represented in three spaces, global space, local space and dynamic space. The articulated object 1 may be mapped to one of the three spaces based on the view at which the user sees and edits the articulated object 1.

The concept of geometrically representing the sketch target in 3D space is defined as a sketch space. This space is view-dependent so that it is designed to be transformed or switched, and delimits the temporal editing bounds as the user moves the 3D view port.

Sketch Space Transformation

To suit the user's specific editing purpose, the transformed spaces directly enhance or visualize different aspects of motion on the viewport that could not be seen with traditional methods for representing joint paths. The present disclosure provides three space concepts, which are global space, local space and dynamic space.

Global Space

The global space is a basic sketch space. This corresponds to a 3D space of an application. In the global space, the inventor represents the evolution of different targets in time and space. In this sense, sketch targets in the global space coincide exactly with the motion. Because of this intuitiveness, the use of global space is a basic representation method in traditional motion edit method.

Particularly, if $\mathcal{M}(t) = (p_0(t), q_0(t), \ldots, q_{N_j-1}(t))$ denotes a specific motion, $p_0(t) \in \mathbb{R}^3$ and $q_i(t) \in \mathbb{S}^3$, $(0 \leq i < N_j)$ denote rotation motion of $i^{th}$ joint and translational motion of the root segment at the time t, respectively, and $N_j$ is the number of joints.

Subsequently, the present disclosure computes a global point on the sketch target from joint j at the time t according to the following Equation 4.

$$s_j(t) = \{(p_0^b + p_0(t), q_0^b q_0(t)) \otimes (p_0^b, q_1^b q_1(t)) \otimes \ldots \otimes (p_{j-1}^b, q_{j-1}^b q_{j-1}(t))\} p_j^b \quad \text{[Equation 4]}$$

Here, $(p_A, q_A) \otimes (p_B, q_B) = (q_A p_B q_A^{-1} + p_A, q_A q_B)$(Lee, 2008). Additionally, the superscript b is a constant value from the initial body configuration. For simplicity, joint indices in a chain from the selected joint j to the root joint are arranged in a descending order.

Local Space

The trajectory in the global space may be seen as collective composition of different joint motions going down from the line of the character skeleton hierarchy. In general, manipulating the motion in this way is very intuitive, but in some instance, it may be necessary to edit.

Figure 6:
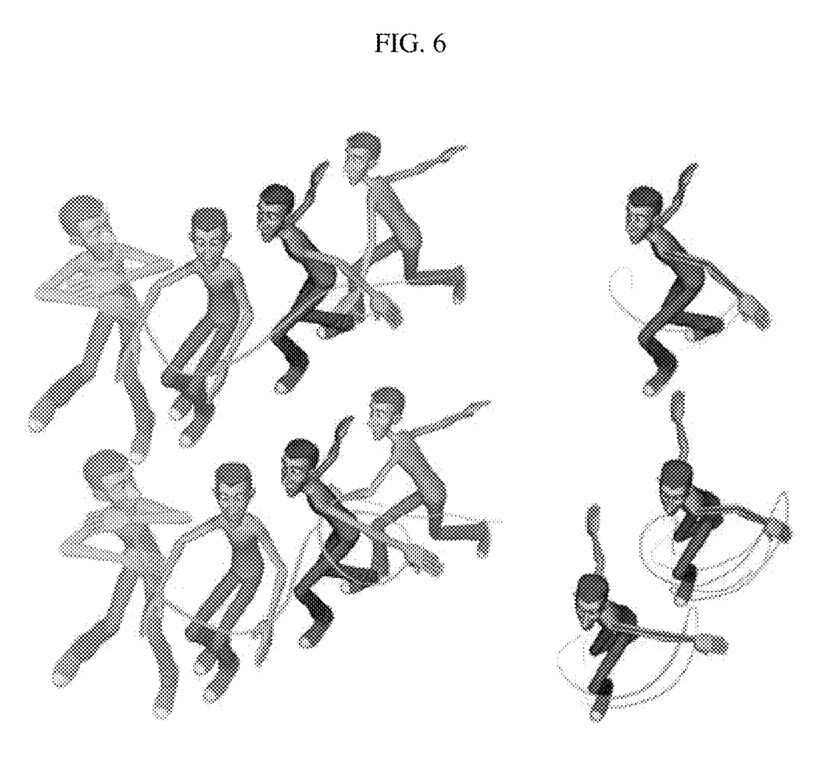
FIG. 6 is a reference diagram illustrating a local space according to an embodiment of the present disclosure.

FIG. 6 is a reference diagram illustrating the concept of global space and local space.

The target selection according to the present disclosure allows to define arbitrary parental relations. The local space changes the visualization by fixing the parent transformation across time, and causes an effect of joint higher in priority ranking (hierarchical ranking) to disappear from visualization.

The present disclosure defines a relative point of the joint j selected by the user with respect to joint k at the time t as $s_{j \to k}(t)$, and this may be presented by the following Equation 5.

$$s_{j \to k}(t) = M_k(t_c) \{(p_k^b + q_k^b q_k(t)) \otimes \ldots \otimes (p_{j-1}^b, q_{j-1}^b q_{j-1}(t))\} p_j^b \quad \text{[Equation 5]}$$

Here, $t_c$ is the current time selected by the user. Additionally, the following Equation 6 is a fixed transformation matrix of joint k with respect to the root joint at t0.

$$M_k(t_c) = (p_0^b + p(t_c), q_0^b q^0(t_c)) \otimes \ldots \otimes (p_{k-1}^b, q_{k-1}^b q_{k-1}(t_c)) \quad \text{[Equation 6]}$$

Particularly, the fixed transformation matrix $M_k(t_c)$ does not change over the time t while computing the sketch target points.

Dynamic Space

Motion is represented on the screen as a 2D slice of 4D data, i.e., 3D poses changing over time. Changing the view alleviates a lack in spatial dimension, but cannot replace the visualization of time.

The representation of body lines or trajectories makes superposition of poses on the space within a given time interval difficult, and due to this, motion editing becomes complex.

In the global space, for motions with a large displacement difference such as running, the superposition of pose may be not a big problem, but for motions close to slow or stationary motions, this may be problematic.

Further, in the case of using the local space, there are increasing chances that a specific body part appears static with respect to the defined parent, causing this pose superposition problem.

To solve this problem, the present disclosure warps the sketch targets by adding a warping vector represented by the following Equation 7.

$$s_j^{warped}(t) = s_j(t) + \alpha q w(t) \quad \text{[Equation 7]}$$

Here, α is a user parameter that determines the degree of warping.

Considering the selected sketch target and the state of motion, a new warping vector is designed to explicitly visualize the time on the joint path.

Figure 9:
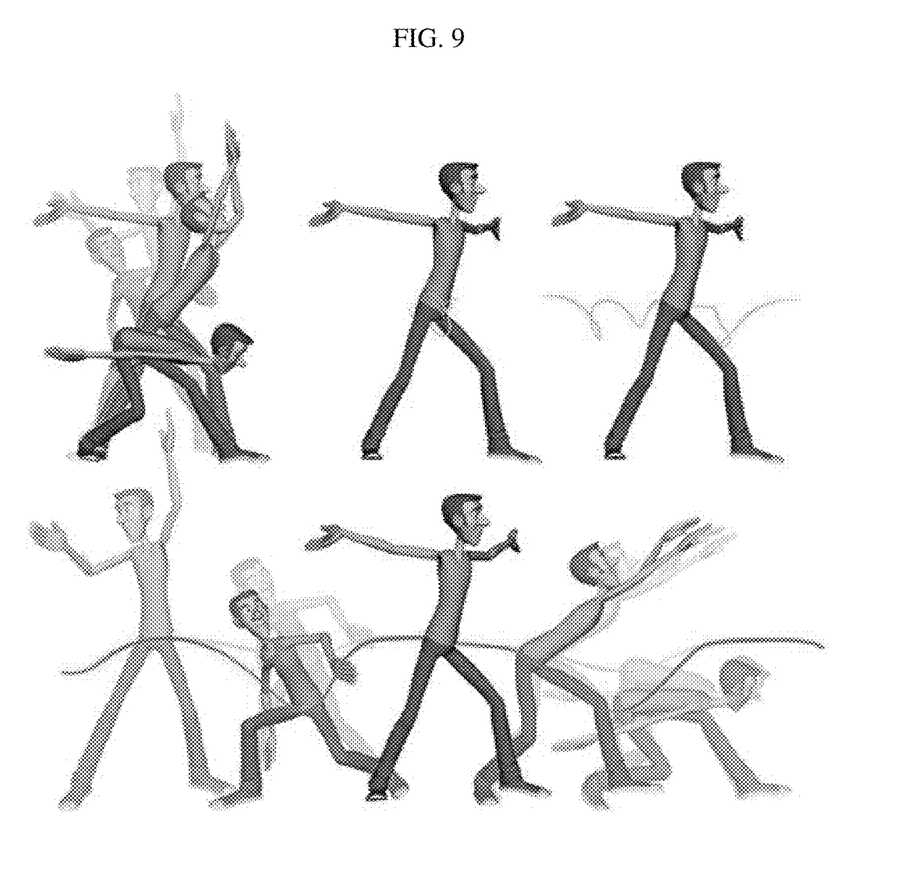
FIG. 9 is a diagram illustrating a dynamic space according to an embodiment of the present disclosure.

FIG. 9 is a diagram illustrating the dynamic space according to an embodiment of the present disclosure.

The inventor evenly distributed frames using axis orthogonal coordinates to viewing direction xcamera so that a visualized space gap between frames was proportional to a time gap between the same frames, and this is as shown in the following Equation 8.

$$w(t) = \underbrace{-((s_0(t) - s_0(t_c)) \cdot n)n}_{\text{warp towards a virtual plane}} + \underbrace{(t - t_c)x_{camera}}_{\text{warp along horizontal axis}} \quad \text{[Equation 8]}$$

Figure 7:
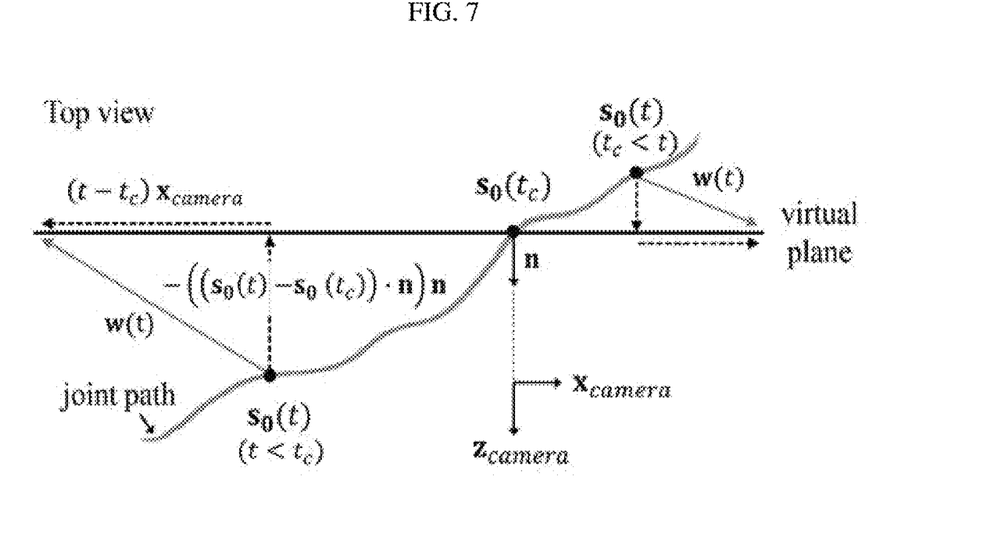
FIG. 7 is a reference diagram illustrating a dynamic warping vector.

Here, n is a normal vector of the plane orthogonal to the viewing direction, and FIG. 7 is a diagram illustrating a dynamic warping vector.

View-Dependent Selection of Editing Boundaries

Another purpose of the sketch area is to disambiguate sketch input values by setting constraints for optimization and visualizing the sketch area. In the state-of-the-art animation technique, designer often starts a task with selecting a central keyframe, which is an important task in adding more dramatic pose variations. Subsequently, a viewpoint is fixed, and a time domain for editing is set.

The inventor observed that these choices of visual domain and camera view are influenced by the editing intention. The choice of viewpoint contributes to the editing in the time range where the motion is visible within the screen area, and for example, a close-up view on a specific body part makes the details of the motion complete. The screen shows a 2D projection of the real 3D space, and the choice of viewpoint may modify the motion properties that are tangent to the visual plane. According to the conventional art, when a central current frame is given, proper constraints for the selected sketch target are automatically provided in the sketch space.

Figure 8:
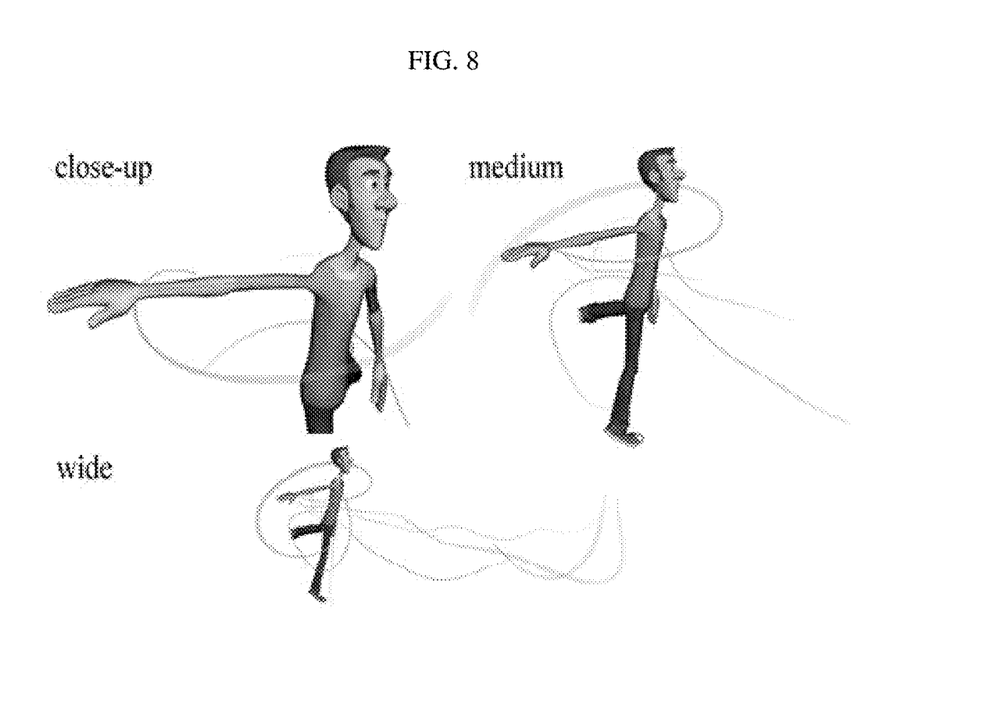
FIG. 8 is a reference diagram illustrating view-dependent editing boundaries.

However, the present disclosure selects an editing range for optimization by considering the distance between the character and the camera. FIG. 8 is a diagram illustrating view-dependent editing boundaries.

The present disclosure considers the fact that that when the viewpoint is close to the target path, a small number of frames are selected, but a larger number of frames are added as the camera moves further. Particularly, a set of bounded time frames $T^b$ in a specific camera at the time $t_c$ may be represented by the following Equation 9 and Equation 10.

$$T^b = T^- \cup T^+ = \{t_c - m, \ldots, t_c, \ldots, t_c + n\} \quad \text{[Equation 9]}$$

$$T^- = \left\{ t_c - m, \ldots, t_c \mid m < f(\bar{s}(t_c)), \sum_{t=t_c-m}^{t_c} l(t) < \eta \right\}, \quad \text{[Equation 10]}$$

$$T^+ = \left\{ t_c, \ldots, t_c + n \mid n < f(\bar{s}(t_c)), \sum_{t=t_c}^{t_c+n} l(t) < \eta \right\},$$

Here, m and n denote the number of preceding frames and the number of succeeding frames respectively, and $\bar{s}(t) \in \mathbb{R}^3$ is the centroid of the character pose at the time t, and f(x) computes the number of bounding frames proportional to the depth of position x.

$l(t) = \|proj(\bar{s}(t) - \bar{s}(t-1))\|$ is the distance between two consecutive centroids in the screen area, and is used to clip the sketch area within a user threshold value 2η.

As f(x) and l(t) are view-dependent, the editing boundaries according to the present disclosure change at the same time with the occurrence of camera motion.

Sketch-Based Motion Editing

The present disclosure provides a method about how motion can be edited from sketches. After the user selects sketch targets, an editing time tc and current camera view, a 2D stroke the user draws is used to constrain one of the sketch targets. The present disclosure fits the motion to the sketch within the bounded time area, and the edited motion is immediately shown to the user, and then refined by simply adding more strokes.

The present disclosure aims at positioning the sketch target close to the selected stroke, and in this stance, maintains the original motion as much as possible. Selection of a best matched sketch target from a plurality of targets is completed, and then, motion having a set of constraints is optimized, and this goes through the following step.

Selection of Single Sketch Target

As a plurality of targets is present in the sketch space, user selection of a specific target should be performed first. The present disclosure considers which sketch target is most visible in the current view, and this is automatically performed each time the user changes the camera view using the sketch space as described above. In conclusion, the user may sketch a stroke over a desired target from a plurality of targets without an individual selection process. The sketch target may be selected through minimization of Equation 11.

$$S^* = \underset{S_i \in S}{\arg\min}\, E(S_i, C^s), \text{ where} \quad \text{[Equation 11]}$$

$$E(S_i, C^s) = \min(\|\bar{S}_i - \bar{C}^s\|, \|\bar{S}_i - \bar{C}^s_{reverse}\|),$$

$$\bar{S}_i = \begin{bmatrix} proj(S_i)(p_0) \\ \vdots \\ proj(S_i)(p_{r-1}) \end{bmatrix}, \bar{C}^s = \begin{bmatrix} C^s(p_0) \\ \vdots \\ C^s(p_{r-1}) \end{bmatrix}$$

Here, $\bar{S}_i$ and $\bar{C}^s$ denote a column vector and a user sketch stroke of $\bar{S}^{r \times 2}$ associated with r representative points of $i^{th}$ projected sketch target, respectively. The present disclosure simply used 1/5 samples through sampling at an equal interval on $\bar{S}_i$ and $\bar{C}^s$ after parameterizing over [0, 1] ($p_0=0.0, \ldots, p_{r-1}=1.0$).

$\bar{C}^s_{reverse}$ is a vector having the same points of $\bar{C}^s$ in a reverse order.

The present disclosure takes a minimum value after comparing directions of two sketch strokes to the sketch targets to account for the freedom of sketching direction. When the sketch targets have similar cost, a target closest to the camera is selected.

Correspondence

After the single sketch target is selected from the above-mentioned equation (11), exact correspondence between the sketch target $S^*$ and the user sketch $C_s$ needs to be defined.

The corresponding vertex locations $\{c_i^s\}$ on the sketch stroke result in constraints on the sketch target $\{s_i^*\}$ in the following way.

First, $\{s_i^*\}$ is transformed to the screen area. That is, in this step, first two components include screen area coordinate axes, and a third element includes a depth value $\{d_i\}$. Subsequently, based on the edge lengths of the target polylines, two curves are parameterized over [0,1]. This induces mapping from $\{s_i^*\}$ to $\{c_i^s\}$, and defines new screen area target constraints $\{(c_i^s, d_i)\}$. Correspondence is computed in the same way for each sketch target, and optimization is performed for each type. In case the lengths of sketch stroke and the sketch target are different, the skeleton lengths are preserved by the IK solver, and different stroke lengths result in spatial warps of the joint path.

Optimization Framework

Given the original motion $\mathcal{M}_0$ and constraints $\mathcal{C}$, the present disclosure handles the optimization problem such that motion $\mathcal{M} = \mathcal{M}_0 \ominus \delta$ satisfies the sketch constraints $\{(c_i^s, d_i)\}$ in $\mathcal{C}$, and this is due to smooth displacement map $\delta$. To solve this problem, the present disclosure adopts a hierarchical motion fitting technique of [Lee and Shin 1999].

The final motion $\mathcal{M}$ may be derived by adding a series of sub-maps $\delta_1, \ldots, \delta_h$ that successively becomes finer, leading to a series of motions $\mathcal{M}_1, \ldots, \mathcal{M}_h$ that is gradually refined, which is as shown in the following Equation 12.

$$\mathcal{M}_h = (\ldots(\ldots((\mathcal{M}_0 \ominus \delta_1) \ominus \delta_2) \ldots \ominus \delta_i) \ldots \ominus \delta_h) \quad \text{[Equation 12]}$$

Here $\delta_i \in \mathbb{R}^{3N_j+3}$ ($1 \leq i \leq h$) may be represented by an array of cubic B-spline curves.

The joint displacement at a specific time t is interpolated by the corresponding component curve of the displacement map, and accordingly is smoothly propagated to the neighboring frames.

At each constrained t, the present disclosure utilizes a sketch-based IK solver with given constraints $\mathcal{C}(t) \in \mathcal{C}$, and this includes projective constraints imposed by the sketch.

In addition to the constraints imposed by the sketch, the present disclosure pre-computes all environmental contact constraints using [Le Callennec and Boulic 2006], and then transforms these values to the selected sketch area. Additionally, with the selection of the sketch targets, additional position constraints are substituted to prevent inaccurate movements in an unselected body part.

The present disclosure assumes that a specific constraint is defined at a specific time. The constraints on the joint paths are considered as a variable constraint that extends the interval of the motion frames, and this may be recognized as a sequence of constraints for the time interval.

Detail Control

One of benefits of hierarchical displacement mapping technique is that the edited detail is easily controlled by providing a displacement level has a user parameter. The present disclosure substitutes the hierarchy level h in equation (12) to the type of sketching brush that provides coarse (h=1) or finer control of result values.

Sketch-Based Inverse Kinematic (IK)

The sketch-based IK solver of the present disclosure recovers the pose by minimizing an objective function which is a weighted combination of four terms. As shown in the following Equation 13, the first term $E_P$ preserves the original pose, the second term $E_S$ pushes the joint in the selected sketch target towards the corresponding point on the sketch, and the third term $E_D$ maintains the original depth of the joint in the selected sketch target. Furthermore, the fourth term $E_C$ enforces constraints such as joint limitations and contact with the surrounding.

$$\underset{x}{\operatorname{argmin}} \omega_P E_P(x) + \omega_S E_S(x) + \omega_D E_D(x) + \omega_C E_C(x) \quad \text{[Equation 13]}$$

Here, the weight $\omega$ defines the relative importance of each term, and $x \in \mathbb{R}^{3N_j+3}$ denotes the degree of freedom of skeleton.

The inventor parameterizes x from Equation 4 using displacement $\delta = (u, v_0, \ldots, v_{N_j-1})$ from given relative configuration $(p_0^b, q_0^b, \ldots, q_{N_j-1}^b)$ as shown in the following Equation.

—below—

$p_0 = p_0^b + u$ $q_i = q_i^b \exp(v_i)$ ($0 \leq i < N_j$)

Penalization of Large Displacement Value

The present disclosure preserves the original pose by penalizing a large displacement value, and this follows the common method of Equation 14 mentioned in earlier study [Gleicher 1997; Gleicher 1998; Lee and Shin 1999].

$$E_P(x) = \sum_i^{N_j} \alpha_i \|x_i\|^2 \quad \text{[Equation 14]}$$

Here, $\alpha_i$ is used to control the rigidity of each individual joint.

Sketch Constraint (Es)

A single sketch stroke automatically produces constraints for a single sketch target. For body lines, the present disclosure uses static constraints according to the following Equation 15.

$$E_S^{static}(x) = \sum_{c_i^s \in C^S} \|c_i^s - proj(s_{j(s)}(x))\|^2 \quad \text{[Equation 15]}$$

Here, $C^S$ is a set of constraints from the sketch, and $s_{j(s)}(x)$ is a point in the sketch target of joint j corresponding to the sketch constraint $c_i^s$.

For joint paths, the present disclosure sets constraints for each frame in the editing area to describe a continuous relationship between each joint path and the given input value.

Considering the choice of the sketch space (global, local or dynamic space), the present disclosure sets a variable constraint at an arbitrary time t as in the following Equation 16.

$$E_S^v(x_t) = \|c^s(t) - proj(M_k(t_c)s_{j(s) \to k}(x_t) + w(t))\|^2 \quad \text{[Equation 16]}$$

Here, $c^s(t)$ is a sketch constraint at the time t, and $M_k(t_c)$ is a fixed transformation value of joint k at the current time $t_c$ (Equation 6). $s_{j(s) \to k}(x_t)$ is a point of joint j in the local space with respect to joint k (Equation 5). Additionally, $w(t)$ is a warping vector at the time t (Equation 8)

When $t = t_c$, a local space expression $M_k(t_c)s_{j(s) \to k}(x_t)$ is equalized to $|s_{j(s)}(x_t)$. That is, for an arbitrary joint k, $M_k(t_c)s_{j(s) \to k}(x_{t_c}) = s_{j(s)}(x_t)$. The warping vector is always 0 at the current time $t_c$ as defined by Equation 8. Accordingly, the present disclosure can use Equation 16 safely.

From the perspective of sketch space, the frame joint k changes at the same time with switching between global and local spaces. When k=0, $M_0(t)s_{j(s) \to 0}(x_t)$ becomes equivalent to $s_{j(s)}(x_t)$ for any arbitrary time t, and this represents a point in the global sketch space. Accordingly, the present disclosure can use a uniform constraint function for both static and variable sketching, and equation for each sketch space is the same as the following Equation 17.

$$E_S(x_t) = \sum_{c_i^s \in C^S} \|c_i^s(t) - proj(M_k(t_c)s_{j(s) \to k}(x_t) + w(t))\|^2 \quad \text{[Equation 17]}$$

As the joint path target always has a single target joint for sketching, the summation only works for the static case (body line).

Depth Constraint (ED)

Because it is difficult to control the depth by sketching, the present disclosure maintains the original depth during the sketching process by activating a depth constraint such as the following Equation 18.

$$E_D(x_t) = \sum_{d_i \in C^D} \|d_i(t) - depth(M_k(t_c)s_{j(s) \to k}(x_t) + w(t))\|^2 \quad \text{[Equation 18]}$$

Here, $C^D$ is a set of depth functions, and d(t) is a depth constraint at the time t. The same principle is applied to a depth constraint function in terms of various sketch spaces as in the case of sketch constraints (Equation 17).

General Constraint (Ec)

For constraints not introduced by the sketch, the present disclosure uses the following Equation 19.

$$E_C(x_t) = \sum_{c_i^e \in C^E} \|c_i^e - (r_j(x_t) + w(t))\|^2 + \sum_{(\theta_i^L, \theta_i^U) \in C^L} \|g(\theta_i^L, \theta_i^U, q_l(x_t))\|^2 \quad \text{[Equation 19]}$$

Here, $C^E$ and $C^L$ are a set of constraints computed from contact with the surrounding and the joint constrained area. $r_j(x)$ and $q_l(x)$ are position and angle of joint j and l, respectively. g(•) is a modified version of smooth max function that penalizes the range outside ($\theta^L$, $\theta^U$) [Tassa et al. 2012].

IK Optimization

To obtain IK solutions for each constrained time frame at interactive rates, the present disclosure computes the Jacobian terms of the objective function in Equation 14. The optimization problem of the present disclosure is non-linear due to projective division of Equation 17, and the present disclosure uses Quasi-Newton L-BFGS [Nocedal and Wright 2006; Johnson 2010].

Embodiment

The present disclosure obtains meaningful extraction results of a given motion by extending the definition of body line and joint path. It proves that motion extraction is useful for extraction or high-level manipulation of motion features. A motion path may be obtained by projecting a translational motion of a character onto the ground.

In general, an abstract target is an arbitrary polyline induced from the motion properties that does not directly lie on the body, and is defined as being non-coincident with a joint projection trajectory. The present disclosure explicitly sets two extraction targets: an average path and a relational line. The motion path may be coupled to a set of extraction targets available in the present disclosure.

The average path may be represented as a general projection trajectory in the selected joint. By editing the average path, some joint projection trajectories may be edited at one time, and in this instance, maintains the properties of the original separate joint paths. The average path may be defined by the following Equation 20.

$$S^{ap} = \left\{ s^{ap}(t) \in \mathbb{R}^3 \mid s^{ap}(t) = \frac{1}{N(J^{sel})} \sum_{j \in J^{sel}} s_j^{jp}(t) \right\} \quad \text{[Equation 20]}$$

Re-Timing

When adjusting the timing of animation, it may require a considerable amount of time. In this context, the applicant proposes a re-timing tool to control the timing by applying a sketching input directly on the joint path using visual feedback.

The user may take timing control, for example, to increase or decrease the motion speed of the articulated object by applying a brush input to the touch screen 51 using the input device such as the touch pen 2.

Figure 10:
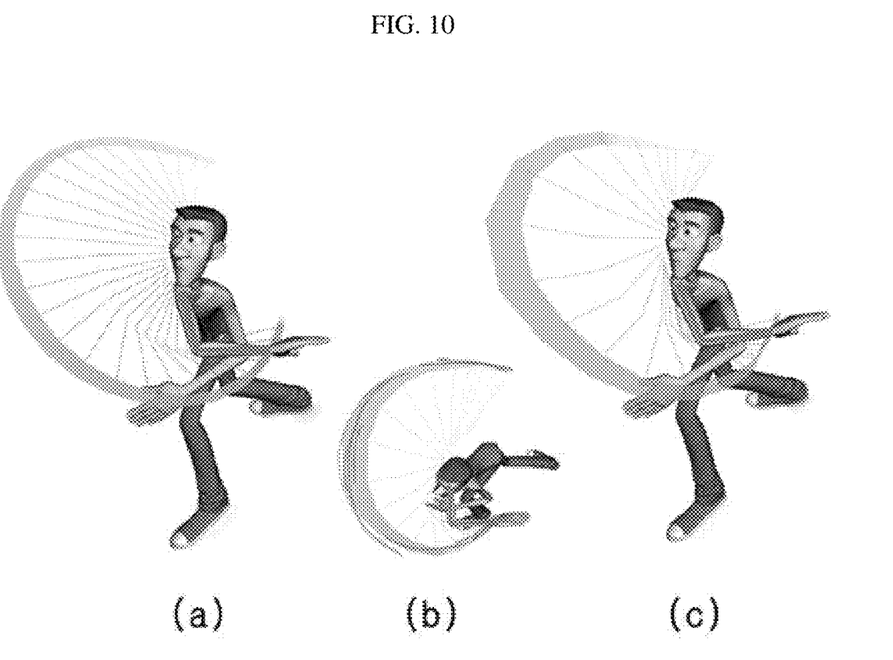
FIG. 10 is a diagram illustrating re-timing according to the present disclosure.

FIG. 10 shows an example of controlling the motion speed of the articulated object through brush input, (A) of FIG. 10 shows the original motion, (B) of FIG. 10 shows a process of adjusting the motion speed of the articulated object by sketching input, and (C) of FIG. 10 shows an example in which as a result, the motion speed increases. In FIG. 10, a part in red line shows that the motion speed increases, and a part in blue line shows that the motion speed reduces.

A change of the speed in the entire path may be obtained by parameterizing a connecting path of joint path as in the following Equation 21.

$$\underset{P}{\text{argmin}} \sum_{p_i \in P} \|\sigma_i - \Delta(p_i)\|^2 + \sum_{p_s \in P^S} \|w\sigma_s - \Delta(p_s)\|^2 \quad \text{[Equation 21]}$$

s.t. $p_0 = 0.0$, $p_{N_p-1} = 1.0$, $P^S \subset P$.

Here, $P_S$ and P denote a set of parameter values arranged in the sketch area and bounded area of the selected joint path, $P_S$ denotes the original distance between two parameters measured along the joint path, and P denotes a weight given by the user's sketching input. When the value satisfies $\omega < 1.0$, the brush motion becomes slow, and when the value satisfies $\omega \geq 1.0$, the brush motion becomes fast.

$\Delta(p_i) = p_i - p_{i-1}$ simply denotes a finite difference between two parameters ($P^s$, P). A new position $s(p_i^*) \in \mathbb{R}^3$ obtained through 1D Laplacian in the path parameter space is also used as soft constraints for optimization.

As the positions of constraint conditions are computed by re-parameterizing the original path, the shape of the path does not change and only the timing changes. It may be useful to linearize the motion by evenly re-distributing the frames over the trajectory, and this may be easily implemented by directly specifying uniform distribution.

An important factor to consider as constraint conditions for optimization in the sketched area is to carefully select temporal boundaries for optimization. Re-timing optimization produces a compensation effect that when the speed of an area increases, the speed of the remaining area slows down. If correct boundaries are not carefully selected, re-timing may cause a visible timing artifact.

$$T_{sp}^- = \{t_c - m, \ldots, t_c | \dot{s}(t_c - m) | < v\},$$

$$T_{sp}^+ = \{t_c, \ldots, t_c + n | \dot{s}(t_c + n) | < v\}, \quad \text{[Equation 22]}$$

Here, $|\dot{s}(t)|$ denotes the speed of collective path selected at the time t, and denotes a user parameter bounding the maximum stopping speed of the path.

Starting from the current frame, the sketch space may search for velocity inflection points on the trajectory to set an editing range, and this may require inspection to fix the sketch space within a specific time range. The user may play animation forward and backward while having visual cues for the speed and spatial trajectory.

Noise Removal

As a technique for removing noise from motion data, instead of 1D Laplacian on the parameter space, Laplacian may be applied to 3D path $L(s(t))=s(t)-\frac{1}{2}(s(t-1)+s(t+1))$.

$$\operatorname*{argmin}_{S} \sum_{s(t) \in S} \|\sigma(t) - L(s(t))\|^2 + \quad \text{[Equation 23]}$$

$$\sum_{s_r \in S^R} \|s'_r - s_r\|^2 + \sum_{s_s \in S^S} \|wL(s_s)\|^2,$$

$$\text{s.t. } S = S^S \cup S^R,$$

Here, $S'^S$ and $S'^R$ denote a set of ordered path positions closest to the given sketching input and a set of remaining areas of the selected joint path S, respectively. It corresponds to original Laplacian coordinates of points in the selected sketch target. The original junction path positions $s_r'$ are used to constrain points outside of the sketched area.

Smoothing control may be processed using a scaling factor w defined by the user, and the present disclosure may visualize the smoothing performance by varying a ratio of smoothing brush size. The edited motion is solved by constraining optimization with the smoothed positions $s_i \in \mathbb{R}^3$.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims.

The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A motion edit method for an articulated object that edits motion of an articulated object using a computing device with a touch screen, comprising:

a) when any one of a joint path and a body line of an articulated object is selected by a user, setting a position constraint of higher level joint according to the user's sketching input and joint hierarchy; and b) generating motion of the articulated object for which the constraint is set, wherein at the step a), when setting a position constraint to any one of joints of the articulated object, the following warping vector is applied to prevent the position constrained joint from being visualized statically:

$$s_j^{warped}(t) = s_j(t) + \alpha w(t)$$

where $\alpha$ denotes a user parameter that determines a degree of warping and w(t) denotes the warping vector at the time t, wherein further comprising:

after the step a), c) when a change in the joint movement occurs by the sketching input, equalizing a time interval between a keyframe of a point in time at which the user input occurred and other frames before and after the keyframe, wherein at the step c), increasing a number of editing frames in proportion to a distance between the articulated object and a camera which captures an image of the articulated object, wherein $T^-$ and $T^+$ are respectively defined by a set of editing frames before and after the current time $t_c$, and a set of bounding frames $T^b$ in a specific camera view is defined by the following equations:

$$T^b = T^- \cup T^+ = \{t_c - m, \ldots, t_c, \ldots, t_c + n\}$$

$T^-$ and $T^+$ are defined by the following equation:

$$T^- = \left\{ t_c - m, \ldots, t_c \mid m < f(\bar{s}(t_c)), \sum_{t=t_c-m}^{t_c} l(t) < \eta \right\},$$

$$T^+ = \left\{ t_c, \ldots, t_c + n \mid n < f(\bar{s}(t_c)), \sum_{t=t_c}^{t_c+n} l(t) < \eta \right\},$$

where m and n denote a number of frames before and after the $t_c$ respectively, and $\bar{s}(t) \in \mathbb{R}^3$ is a motion centroid of the articulated object at the time $t_c$, and f(x) corresponds to a function which computes a number of bounding frames proportional to depth of position x and l(t) denotes a distance between two consecutive centroids in the screen area and $\mathbb{R}^3$ denotes 3-dimensional space.

2. The motion edit method for an articulated object according to claim 1, wherein the step a) comprises:

determining a stroke where the sketching input is applied to the touch screen to be a joint connecting part, and classifying each joint corresponding to joints before and after the joint connecting part into the higher level joint and lower level joint; and applying the position constraint to the higher level joint.

3. The motion edit method for an articulated object according to claim 1, wherein the step b) comprises:

generating and visualizing motion in response to the sketching input by fixing parent transformation across time with respect to a sketch space to which the sketching input is applied.

4. A motion editing apparatus for an articulated object comprises:
- a touch screen configured to receive a user's sketching input of any one of a joint path and a body line of an articulated object displayed on the screen; and
- a processor configured to a) set a position constraint of higher level joint with regard to the joint path or body line selected by the user through the touch screen according to the user inputted sketching input and joint hierarchy, and b) compute the motion of the articulated object for which the constraint is set,
wherein the processor is further configured to apply the following warping vector to prevent the position constrained joint from being visualized statically when setting a position constraint to any one of joints of the articulated object:

$$s_j^{warped}(t) = s_j(t) + \alpha w(t)$$

where α denotes a user parameter that determines a degree of warping and w(t) denotes the warping vector at the time t,
wherein when a change in the joint movement occurs by the sketching input, the processor is further configured to equalize a time interval between a keyframe of a point in time at which the user input occurred and other frames before and after the keyframe,
wherein the processor is further configured to increase a number of editing frames in proportion to a distance between the articulated object and a camera which captures an image of the articulated object,
wherein $T^-$ and $T^+$ are respectively defined by a set of editing frames before and after the current time $t_c$, and a set of bounding frames $T^b$ in a specific camera view is defined by the following equations:

$$T^b = T^- \cup T^+ = \{t_c-m, \ldots, t_c, \ldots, t_c+n\}$$

$T^-$ and $T^+$ are defined by the following equation:

$$T^- = \left\{ t_c - m, \ldots, t_c \mid m < f(\bar{s}(t_c)), \sum_{t=t_c-m}^{t_c} l(t) < \eta \right\},$$

$$T^+ = \left\{ t_c, \ldots, t_c + n \mid n < f(\bar{s}(t_c)), \sum_{t=t_c}^{t_c+n} l(t) < \eta \right\},$$

where m and n denote a number of frames before and after the $t_c$, respectively, and
$\bar{s}(t) \in \mathbb{R}^3$ is a motion centroid of the articulated object at the time $t_c$, and f(x) corresponds to a function which computes a number of bounding frames proportional to depth of position x and l(t) denotes a distance between two consecutive centroids in the screen area and $\mathbb{R}^3$ denotes 3-dimensional space.

* * * * *